United States Patent
Song et al.

(10) Patent No.: US 12,296,478 B2
(45) Date of Patent: May 13, 2025

(54) MORPHABLE BODY

(71) Applicant: Toyota Motor Engineering & Manufacturing North America, Inc., Plano, TX (US)

(72) Inventors: Yuyang Song, Ann Arbor, MI (US); Masato Tanaka, Ann Arbor, MI (US); Mingzhe Li, Atlanta, GA (US); Hang Qi, Marietta, GA (US)

(73) Assignees: Toyota Motor Engineering & Manufacturing North America, Inc., Plano, TX (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/351,878

(22) Filed: Jul. 13, 2023

(65) Prior Publication Data

US 2025/0018559 A1   Jan. 16, 2025

(51) Int. Cl.
*B25J 9/14* (2006.01)
*B25J 9/10* (2006.01)

(52) U.S. Cl.
CPC ............. *B25J 9/142* (2013.01); *B25J 9/1075* (2013.01); *B25J 9/1085* (2013.01)

(58) Field of Classification Search
CPC ......... B25J 9/142; B25J 9/1075; B25J 9/1085
See application file for complete search history.

(56) References Cited

U.S. PATENT DOCUMENTS 10,933,974 B2   3/2021   Tsuruta et al.

FOREIGN PATENT DOCUMENTS

WO   2020056254 A1   3/2020

OTHER PUBLICATIONS

Takashima et al., "Pneumatic artificial rubber muscle using shapememory polymer sheet with embedded electrical heating wire", 2014 (Year: 2014).*
Zhang et al., "Fast-Response, Stiffness-Tunable Soft Actuator by Hybrid Multimaterial 3D Printing", Advanced Functional Materials, 2019 (9 pages).
Yang et al., "Novel Design and Three-Dimensional Printing of Variable Stiffness Robotic Grippers", Journal of Mechanisms and Robotics, vol. 8, 2016 (15 pages).
Takashima et al., "Characteristics of Pneumatic Artificial Rubber Muscle Using Two Shape-Memory Polymer Sheets", Journal of Robotics and Mechatronics, vol. 33, No. 3, 2021, pp. 653-664 (12 pages).
Wang et al., "Soft Grasping Mechanisms Composed of Shape Memory Polymer Based Self-Bending Units", Composites, 2018 (13 pages).

(Continued)

*Primary Examiner* — Terence Boes
(74) *Attorney, Agent, or Firm* — Christopher G. Darrow; Darrow Mustafa PC (57) ABSTRACT

A body can be configured to be selectively morphable. One or more body support members can be operatively connected to an outer surface of the body. The one or more body support members can be arranged in a pattern to define at least one morphing region. A contracting member (e.g., a shape memory polymer) can be operatively connected to the outer surface of the body. When activated, the contracting member can contract, which can cause the body to morph (e.g., bend) from a non-activated configuration into an activated configuration.

17 Claims, 9 Drawing Sheets

(56) References Cited

OTHER PUBLICATIONS

Takashima et al., "Curved type pneumatic artificial rubber muscle using Shape-Memory Polymer." Journal of Robotics and Mechatronics, vol. 24, No. 3, 2012, pp. 472-479 (9 pages).
Wang et al., "Shape Memory Alloy-Based Soft Gripper with Variable Stiffness for Compliant and Effective Grasping", Soft Robotics, vol. 4, No. 4, 2017, pp. 379-389 (12 pages).
Son et al. "A Shape Memory Polymer Adhesive Gripper For Pick-and-Place Applications", Thesis, 2019 (29 pages).
Nishimura et al. "Soft robotic hand with finger-bending/friction-reduction switching mechanism through 1-degree-of-freedom flow control", IEEE Robotics and Automation Letters, 2022 (8 pages).

* cited by examiner

MORPHABLE BODY

FIELD

The subject matter described herein generally relates to structures and, more particularly, to selectively morphable structures.

BACKGROUND

Many efforts have been made to make robots that correspond to human body parts. For instance, some robots try to mimic human fingers. Some robotic fingers are metal structures with hinges. Other robotic fingers are made from silicon rubber.

SUMMARY

In one respect, the present disclosure is directed to a morphable body. The morphable body includes a body. The morphable body can include one or more body support members operatively connected to an outer surface of the body. The one or more body support members can be arranged in a pattern to define at least one morphing region. The morphable body can include a contracting member operatively connected to the body. When activated, the contracting member can contract to cause the body to morph from a non-activated configuration into an activated configuration.

In another respect, the present disclosure is directed to a system. The system can include a morphable body. The morphable body includes a body. One or more body support members can be operatively connected to the body. The one or more body support members can be arranged in a pattern to define at least one morphing region. A contracting member can be operatively connected to the body. When activated, the contracting member can contract to cause the body to morph from a non-activated configuration into an activated configuration. The system can include one or more processors operatively connected to selectively activate and deactivate the contracting member.

In still another respect, the subject matter described herein is directed to a method of controlling a morphable body. The morphable body can include a body. One or more body support being operatively connected to the body. A shape memory material can be operatively connected to the body. The method can include activating the shape memory material such that the shape memory material contracts to cause the body to morph from a non-activated configuration into an activated configuration. The method can include deactivating the shape memory material such that the activated configuration of the body is maintained by the shape memory material.

DETAILED DESCRIPTION

Metal robotic fingers are heavy, and it is difficult to control finger movement. Further, silicone rubber robotic fingers do not provide sufficient stiffness. Accordingly, arrangements described herein are directed to a morphable body. The morphable body can include a body. One or more body support members can be operatively connected to the body. The one or more body support members can be arranged in a pattern to define at least one morphing region.

A contracting member (e.g., a shape memory polymer) can be operatively connected to the outer surface of the body. The contracting member can be configured such that, when activated, the contracting member can contract to cause the body to morph (e.g., bend) from a non-activated configuration into an activated configuration. The contracting can further be configured such that, when deactivated, it can maintain the body in the activated configuration. Thus, the body can be morphed into and maintained in an activated configuration without the use of heavy and bulky mechanical structures, with sufficient stiffness, and/or with reduced power input.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
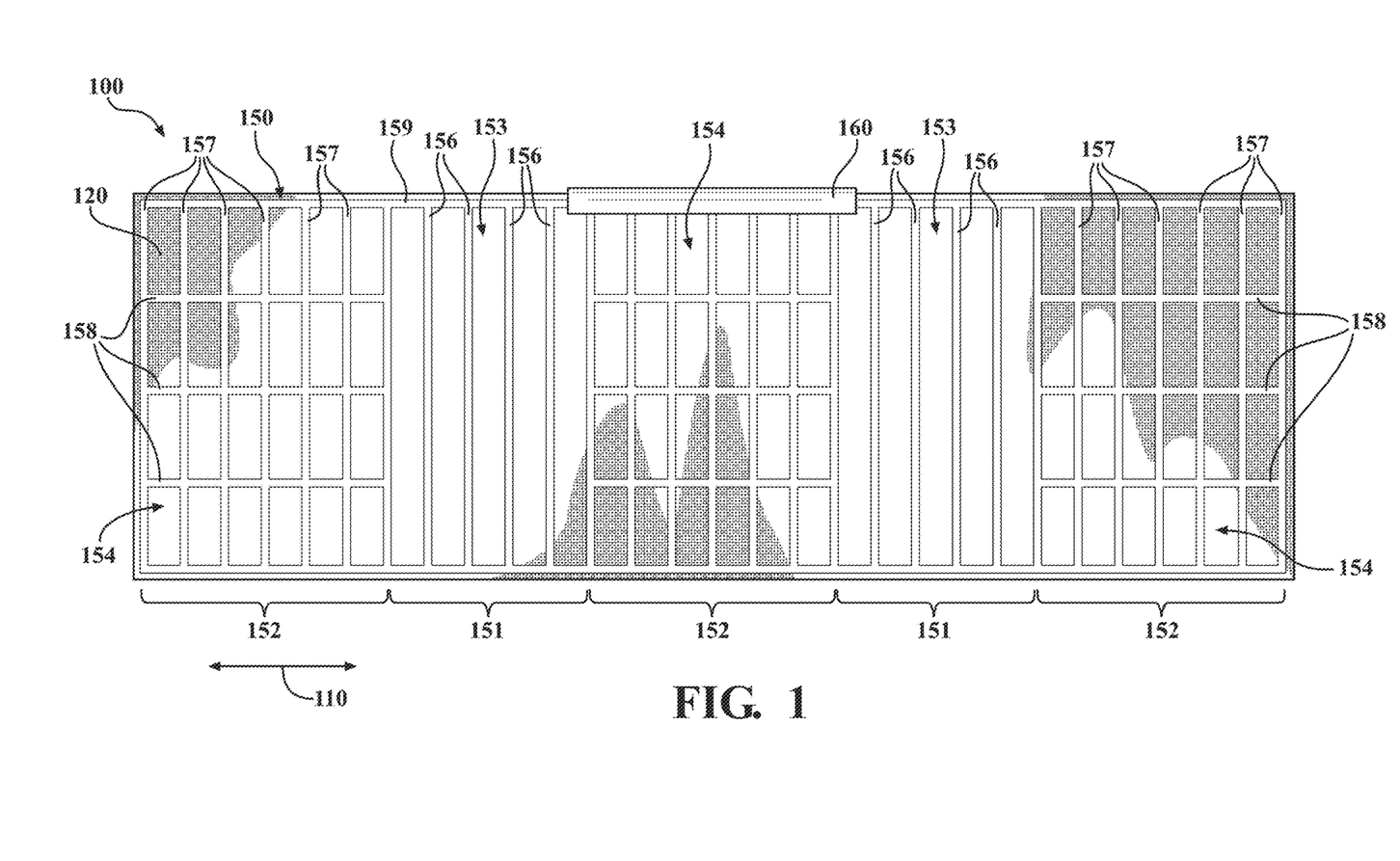
FIG. 1 is an example of a morphable body

Referring to FIG. 1, an example of a body 100 is shown. The body 100 can be morphable. The body 100 can have any suitable size, shape, and/or configuration. In some arrangements, the body 100 can have a generally elongated shape. In some arrangements, the body 100 can have a direction of elongation 110.

The body 100 can be made of any suitable material. For instance, in some arrangements, the body 100 can be made of a flexible, pliable, stretchable, and/or compliant material. The body 100 can be made of a durable material. In one or more arrangements, the body 100 can be made of fabric. In some arrangements, the body 100 can be made of a fabric or other material that is fluidly impermeable. It should be noted that FIG. 1 shows a non-inflated condition of the body 100.

Figure 2:
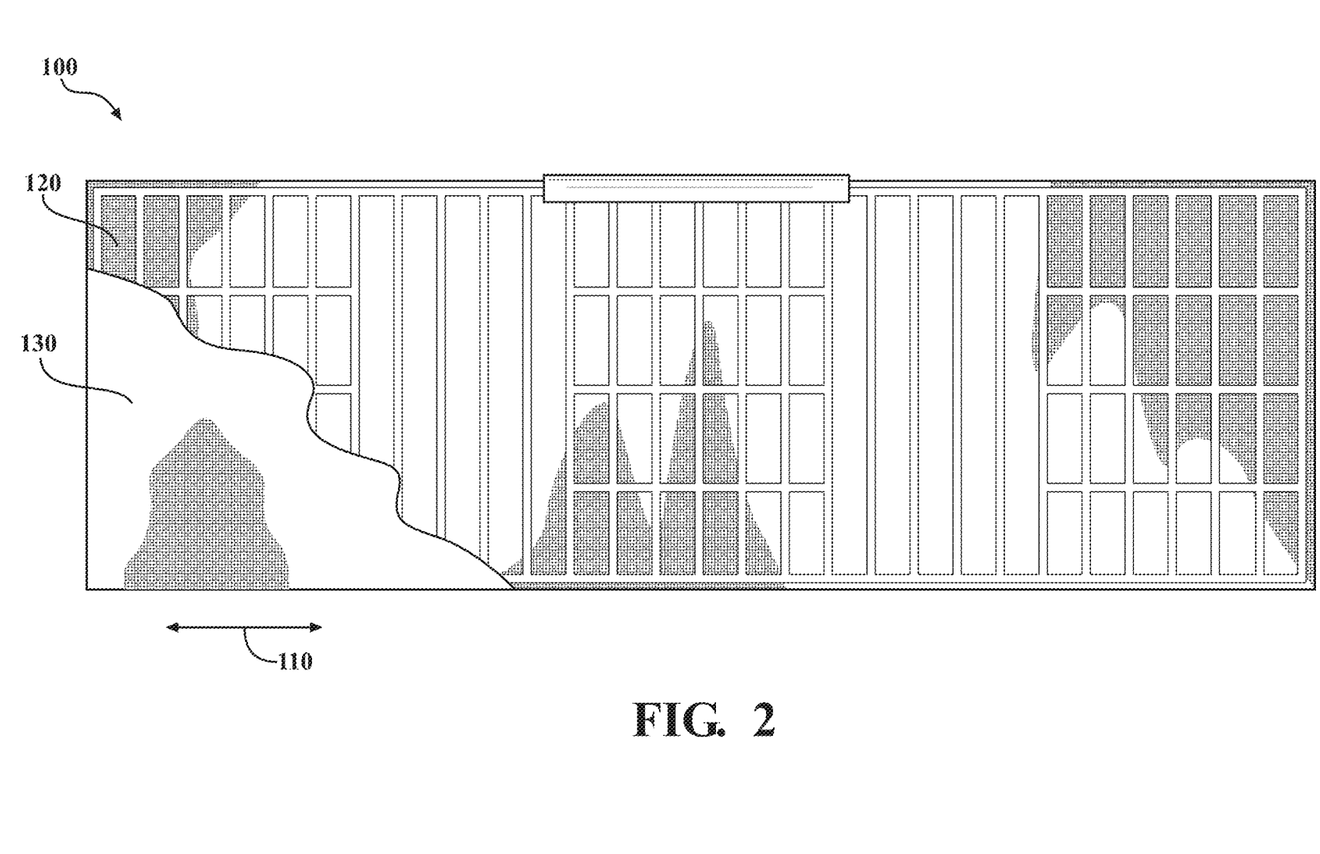
FIG. 2 is an example of the morphable body, a portion of which is broken away to show an inner chamber.

The body 100 can include an outer surface 120. The outer surface 120 can define at least a portion of the exterior of the body 100. The body 100 can be at least partially hollow. Thus, the body 100 can have an inner chamber 130 (FIG. 2).

In some arrangements, the inner chamber 130 can be substantially fluid impermeable. In such case, the body 100 can be inflated with air and can retain the air without allowing the air to escape through the material of the body 100. In some arrangements, the body 100 can be made of a fabric that is not fluidly impermeable; however, a fluidly impermeable member, such as a balloon or a sleeve 140 (FIG. 3) can be received within the body 100. The sleeve 140 can be made of any suitable material, such as a plastic or fabric material. The sleeve 140 can stretch when inflated.

Figure 3:
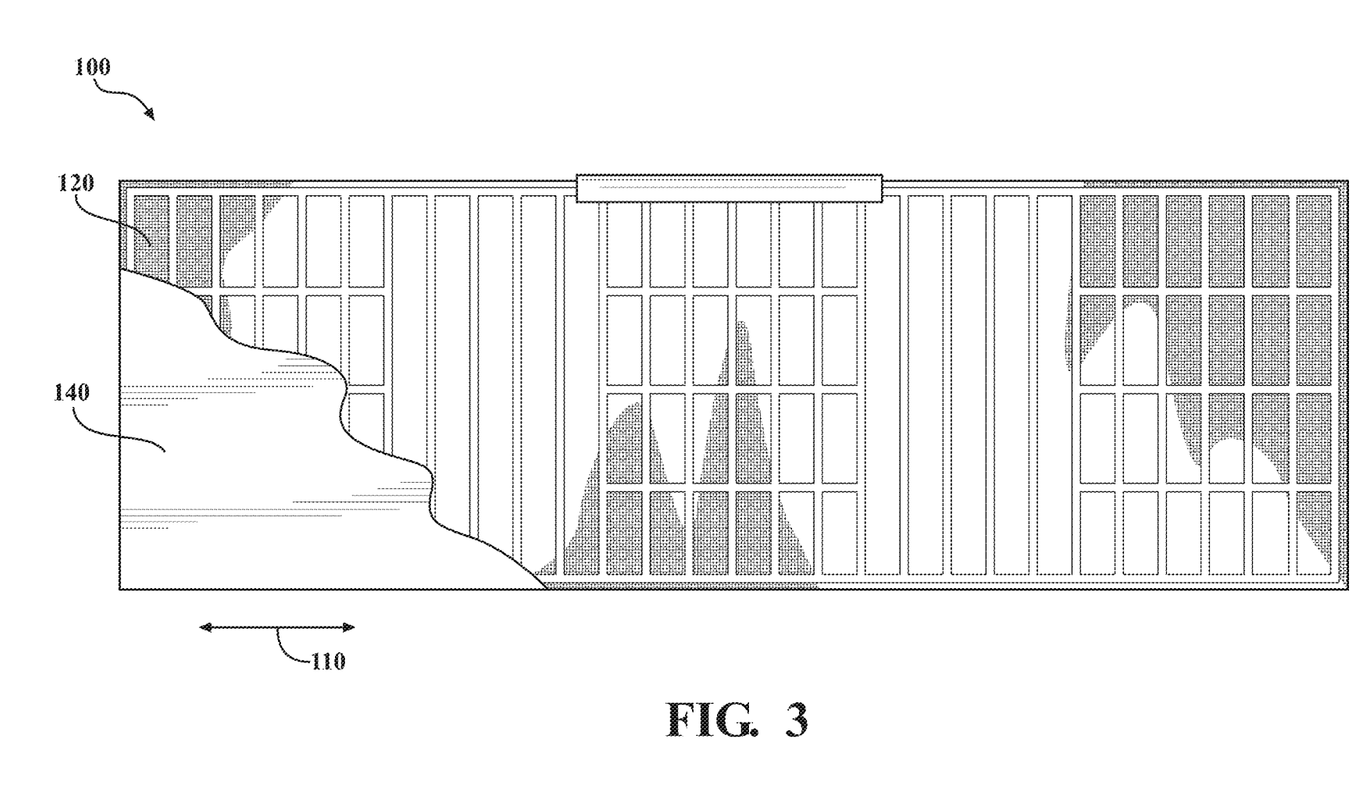
FIG. 3 is an example of the morphable body, a portion of which is broken away to shown an inner sleeve.

In one or more arrangements, the body 100 can be configured to be inflatable. Thus, the body 100 can include one or more ports or valves to allow air or other fluid to be delivered to and/or released from the inner chamber 130 or the sleeve 140. The body 100 can be operatively connected to a fluid source. The inner chamber 130 or the sleeve 140 can be sealable to retain a fluid therein.

In some arrangements, the body 100 can be substantially rectangular when not inflated, but it will be appreciated that other shapes are possible. In some arrangements, the body 100 can be substantially cylindrical or substantially elliptical cylindrical when inflated, but it will be appreciated that other shapes are possible.

One or more body support members 150 can be associated with the body 100. The body support member(s) 150 can provide structural support to the body 100. The body support member(s) 150 can be used to facilitate a desired deformation of the body 100.

Figure 7:
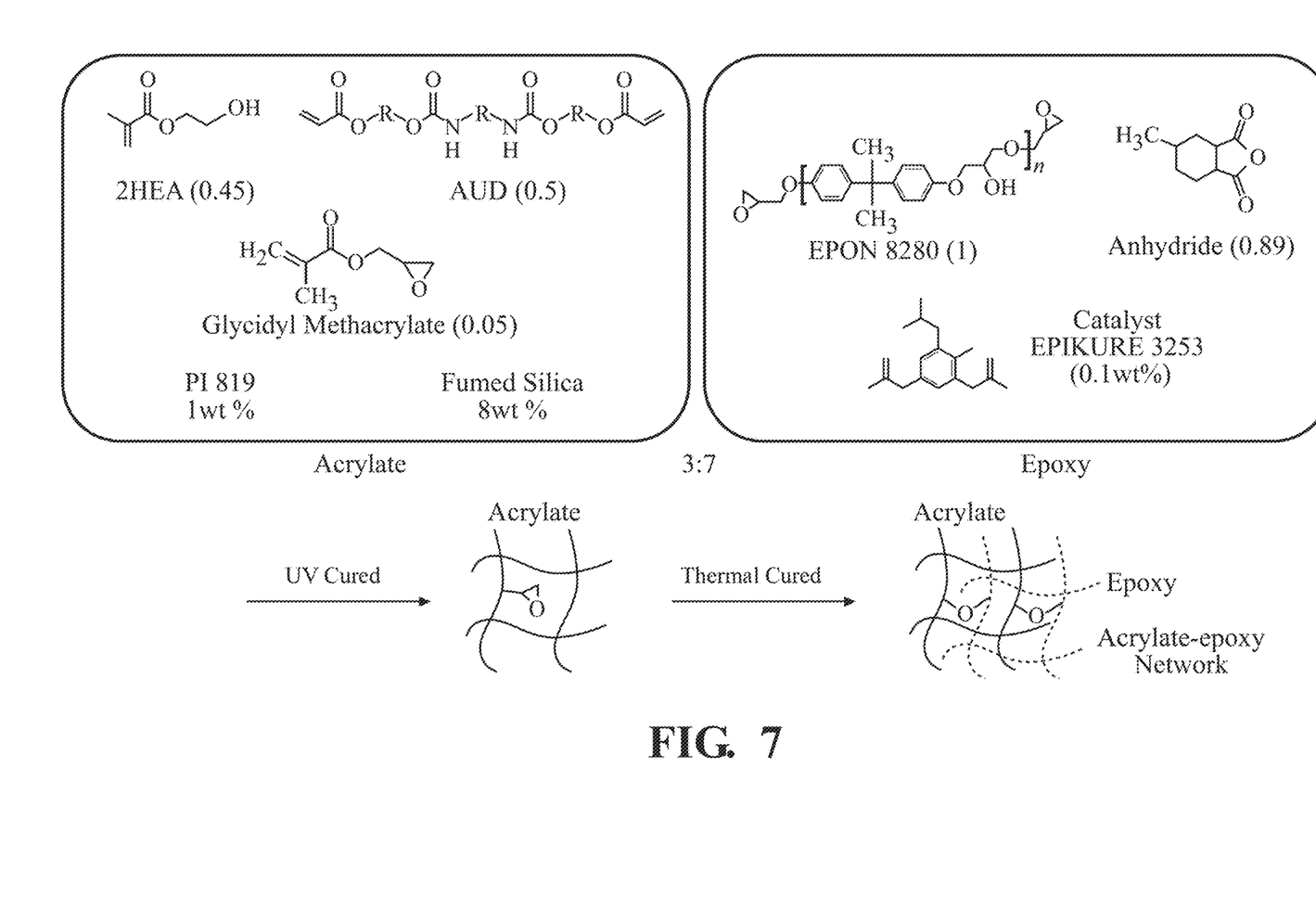
FIG. 7 is an example of a material for a body support member.

The body support member(s) 150 can be made of any suitable material. For instance, the body support member(s) 150 can be made of resin. The body support member(s) 150 can be made of a combination of acrylate and epoxy. In one or more arrangements, the acrylate and epoxy can be in a ratio of about 3 to about 7. One non-limiting example of a suitable material for the body support member(s) 150 is shown in FIG. 7. The body support member(s) 150 can be made of E30 ink.

The body support member(s) 150 can be operatively connected to the body 100. For instance, the body support member(s) 150 can be operatively connected to outer surface 120 of the body 100. The body support member(s) 150 can be applied to the outer surface 120 in any suitable manner, now known or later developed. For instance, the body support member(s) 150 can be three-dimensionally printed or deposited on the outer surface 120. In one or more arrangements, the body support member(s) 150 can be applied to the body 100 by digital ink writing. It should be noted that, at least in some arrangements, the body support member(s) 150 can be operatively connected to an inner surface of the body 100. In still further arrangements, the body support member(s) 150 can be operatively connected to the outer surface 120 and the inner surface of the body 100.

In some arrangements, the body support member(s) 150 can be provided on only one side of the body 100, such as is shown in FIG. 1. In some arrangements, the body support member(s) 150 can be provided on opposite sides of the body 100. In such case, the body support member(s) 150 on the opposite sides of the body 100 may not be connected to each other. Alternatively, the body support member(s) 150 on opposite sides of the body can be connected to each other, such as by wrapping around a side or edge of the body 100.

The body support member(s) 150 can be arranged in one or more patterns on the body 100 to achieve a desired deformation of the body 100. For instance, the body support member(s) 150 can be arranged in a pattern to define one or more morphing regions. In a morphing region, the body support member(s) 150 can help cause a deformation of the body 100 when a contracting member 160 is activated. For instance, the body support member(s) 150 can be arranged in a pattern configured to cause the body 100 to bend when a contracting member 160 is activated. The body support member(s) 150 can function as a hinge. In some instances, the body support member(s) 150 can be arranged in another pattern to define one or more non-morphing regions.

As an example, in one or more arrangements, the body support member(s) 150 arranged in one or more first patterns 151 and one or more second patterns 152. The first pattern(s) 151 can be different from the second pattern(s) 152. The first pattern(s) 151 can define a morphing region 153 of the body 100. For instance, the morphing region 153 can define a bending region. The second pattern(s) 152 can define non-morphing region(s) 154 of the body 100. For instance, the non-morphing region 154 can define a non-bending region of the body 100. In some arrangements, the morphing region(s) 153 can be located between two non-morphing regions 154.

In some arrangements, the first pattern 151 can include a plurality of substantially linear segments 156. The plurality of substantially linear segments 156 can be substantially parallel to each other. In some arrangements, the plurality of substantially linear segments 156 can be substantially perpendicular to the direction of elongation 110 of the body 100. It will be appreciated that the arrangement of the first pattern 151 can facilitate bending of the body 100 in this region.

The second pattern 152 can include a grid pattern including a first plurality of substantially linear segments 157 and a second plurality of substantially linear segments 158. The first plurality of substantially linear segments 157 can be substantially parallel to each other. The second plurality of substantially linear segments 158 can be substantially parallel to each other. The first plurality of substantially linear segments 157 and the second plurality of substantially linear segments 158 can cross each other. The first plurality of substantially linear segments 157 and the second plurality of substantially linear segments 158 can be substantially perpendicular to each other. In some arrangements, the first plurality of substantially linear segments 157 can be substantially parallel to the plurality of substantially linear segments 156. In some arrangements, the first plurality of substantially linear segments 157 and/or the plurality of substantially linear segments 156 can be substantially perpendicular to a direction of elongation 110 of the body 100. It should be noted that, in some arrangements, the substantially linear segments of the first pattern 151 and the substantially linear segments of the second pattern 152 can be connected to each other. For instance, there can be one or more connecting segments on or more sides of the patterns 151, 152. One example of a connecting segment 159 is shown in FIG. 1. The connecting segment 159 can be substantially linear. It will be appreciated that the arrangement of the second pattern 152 can resist bending or morphing of the body 100 in this region.

Figure 8:
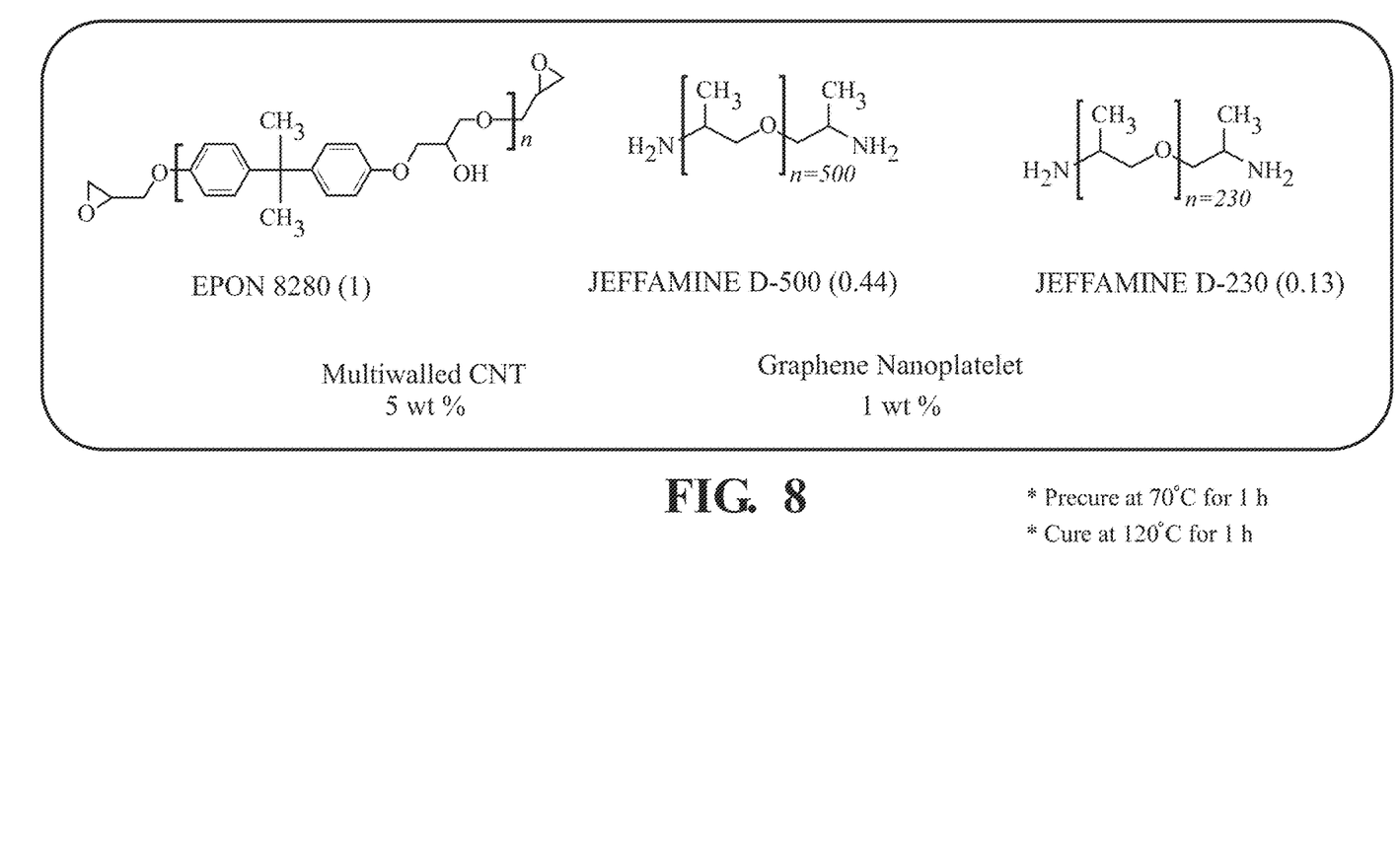
FIG. 8 is an example of a shape memory polymer.
Figure 9:
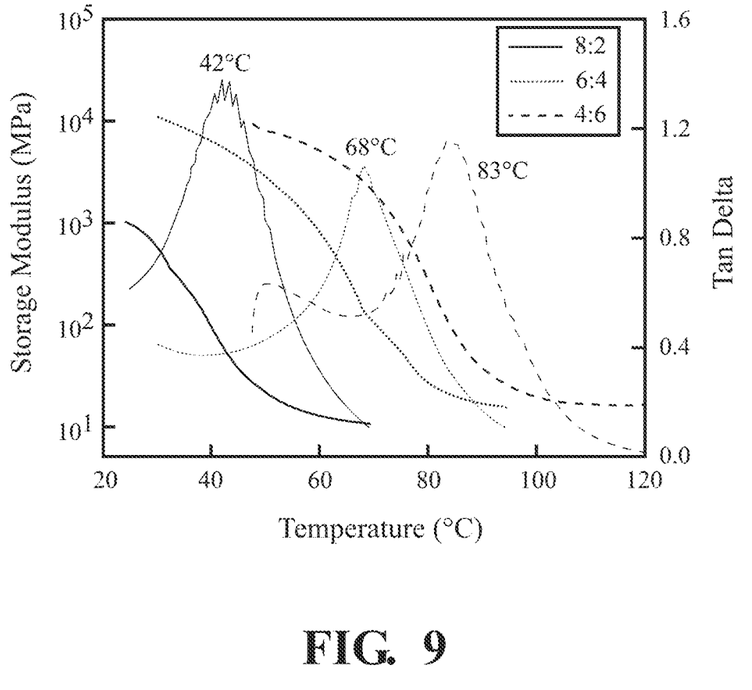
FIG. 9 is a graph of temperature versus storage modulus for the shape memory polymer.

One or more contracting members 160 can be associated with the body 100. The contracting member(s) 160 can be made of any suitable material, such as a shape memory material. For instance, the shape memory material can be a shape memory polymer. The shape memory polymer can be any suitable type of shape memory polymer, now known or later developed. One example of a suitable shape memory polymer is shown in FIG. 8. FIG. 9 is a graph of temperature versus storage modulus for one example of the contracting member(s) 160. In some arrangements, the contracting member(s) 160 can be conductive ink.

The contracting member(s) 160 can be operatively connected to the body 100. For instance, the contracting member(s) 160 can be operatively connected to outer surface 120. The contracting member(s) 160 can be applied to the outer surface 120 in any suitable manner, now known or later developed. For instance, the contracting member(s) 160 can be three-dimensionally printed or deposited on the outer surface 120. In some arrangements, the contracting member(s) 160 can be applied to the outer surface 120 by digital ink writing. It should be noted that, at least in some arrangements, the contracting member(s) 160 can be operatively connected to an inner surface of the body 100. In still further arrangements, the contracting member(s) 160 can be operatively connected to the outer surface 120 and the inner surface of the body 100. In some arrangements, the contracting member(s) 160 can extend in a direction of elongation of the body 100.

The contracting member(s) 160 can be provided in any suitable location on the body 100. For instance, the contracting member(s) 160 can be provided entirely within, partially within, or adjacent to an area corresponding to a morphing region (see, e.g., FIG. 1) or to a non-morphing region (see, e.g., FIGS. 4A-4B). More particularly, the contracting member(s) 160 can be provided entirely within, partially within, or adjacent to an area corresponding to the first pattern 151 or to the second pattern 152. In some arrangements, the contracting member(s) 160 can be provided entirely within, partially within, or adjacent to an area corresponding to both a morphing region and a non-morphing region. In some arrangements, the contracting member(s) 160 can be provided in a location that does not overlap or is not adjacent to a morphing region and/or a non-morphing region.

In some arrangements, contracting member(s) 160 can be provided along an edge of the body 100. In some arrangements, the contracting member(s) 160 can be provided on only one side of the body 100. In some arrangements, the contracting member(s) 160 can be provided on body side of the body 100.

The contracting member(s) 160 can be configured to provide desired actuation characteristics. For instance, the contracting member(s) 160 can be configured such that, when an activation input is initially provided, the contracting member(s) 160 can contract. As a result, the body 100 can deform into an activated configuration based on the patterns of the body support member(s) 150.

Further, the contracting member(s) 160 can be configured such that, when deactivated, the activated configuration of the body can be maintained by the contracting member(s) 160. The contracting member(s) 160 can be configured such that, when re-activated, the contracting member(s) 160 can relax to cause the body 100 to substantially return to the non-activated configuration.

The contracting member(s) 160 can be activated by providing an activation input (i.e., heat) to the contracting member(s) 160. The contracting member(s) 160 can be heated in any suitable manner, now known or later developed. For instance, the contracting member(s) 160 can be heated by the Joule effect by passing electrical current through the contracting member(s) 160. The contracting member(s) 160 can be deactivated by discontinuing the activation input to the contracting member(s) 160. It will be appreciated that the arrangement of the body support member(s) 150 can be used to control actuation, shapes, configuration, and/or surface features of the body 100.

In some arrangements, the contracting member(s) 160 can be operatively connected to one or more input elements, such as wires 170 (see FIGS. 4A-4B) or electrodes. The input elements can be operatively connected to the contracting member(s) 160 in any suitable manner, such as by one or more fasteners, one or more adhesives, one or more forms of mechanical engagement, other form of connection, and/or any combination thereof.

While arrangements shown in FIGS. 1-4 shown a single contracting member 160, it will be appreciated that in some arrangements, there can be a plurality of contracting members 160. In such an arrangement, the contracting members 160 can be activated substantially simultaneously, or the contracting members 160 can be activated independently of each other. The contracting members 160 can be activated in any suitable manner to achieve a desired activated configuration.

Figure 4A:
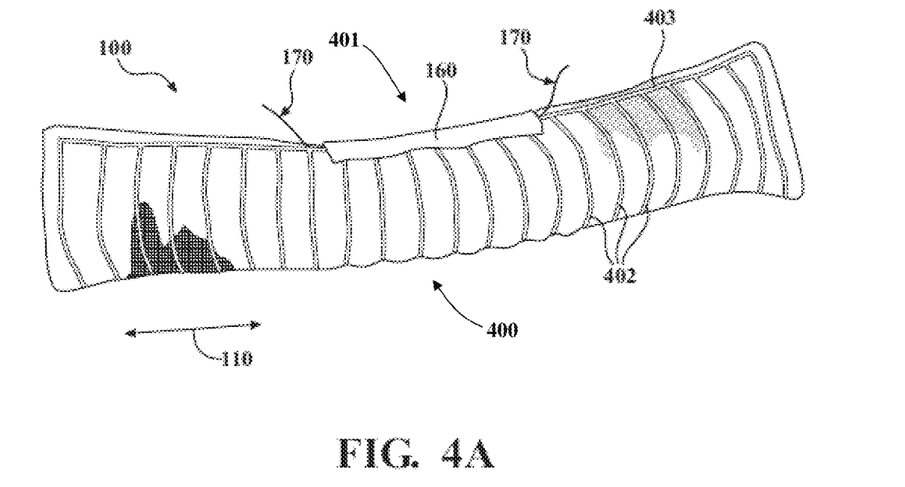
FIG. 4A is an example of the morphable body, showing a non-activated configuration.
Figure 4B:
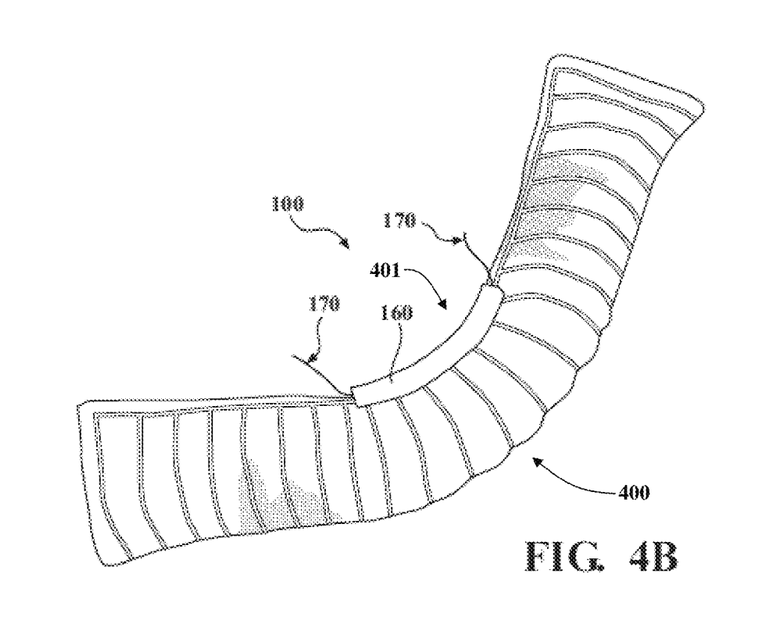
FIG. 4B is an example of the morphable body, showing an activated configuration.

The body 100 can have a non-activated configuration and one or more activated configurations. Examples of each of these configurations will be described in turn below. For instance, FIGS. 4A-4B present an example of the body 100. Here, the body 100 can have a pattern 400 of body support member(s) 150, which can define a bending region 401. The pattern 400 can include a plurality of linear segments 402. The plurality of linear segments 402 can be substantially parallel to each other. In some arrangements, the plurality of linear segments 402 can be substantially perpendicular to the direction of elongation 110 of the body 100. There can be a segment 403 that can connect the plurality of linear segments 402. The segment 403 can be substantially linear. The segment 403 can be transverse to the plurality of linear segments 402. The segment 403 can be substantially perpendicular to the plurality of linear segments 402. The segment 403 can be substantially parallel to the direction of elongation 110. In FIGS. 4A-4B, it will be appreciated that, in some arrangements, the plurality of linear segments 402 can wrap around to the opposite side of the outer surface 120 of the body 100. In other arrangements, the plurality of linear segment 402 can be provided on one side of the body 100.

FIG. 4A shows an example of a non-activated configuration of the body 100. In such case, an activation input is not provided to the contracting member(s) 160. For instance, an activation input (e.g., electrical current) to heat the contracting member(s) 160 is not provided. Thus, the body 100 is in a neutral or non-activated configuration. The body 100 can be in a substantially linear or straight configuration.

FIG. 4B shows an example of the body 100 in an activated configuration. It will be appreciated that FIG. 4B is merely on example of an activated configuration, as the body 100 can have a plurality of activated configurations. An activation input can be provided to the contracting member(s) 160. For instance, electrical current can be supplied to the contracting member(s) 160, which causes the contracting member(s) 160 to heat by the Joule effect. As a result, the contracting member(s) 160 can contract. Due to the arrangements of the body support member(s) 150, the body 100 can bend or curl as is shown in FIG. 4B.

The bending angle can be configured as desired. In some arrangements, the bending angle can be an acute angle or an obtuse angle. In some arrangements, the bending angle can be about 90 degrees, about 85 degrees, about 80 degrees, about 75 degrees, about 70 degrees, about 65 degrees, about 60 degrees, about 55 degrees, about 50 degrees, about 45 degrees, about 40 degrees, about 35 degrees, about 30 degrees, about 25 degrees, about 20 degrees, about 15 degrees, about 10 degrees, or about 5 degrees. The bending angle and the bending stiffness can be controlled. The contracting member(s) 160 applied to the body 100 can be used to tune the bending angle as well.

The contracting member(s) 160 can be configured such that, when deactivated (e.g., the activation input is stopped), the activated configuration of the body 100 can be maintained by the contracting member(s) 160. The contracting member(s) 160 can be further configured such that, when re-activated, the contracting member(s) 160 can relax to cause the body 100 to substantially return to their non-activated configuration.

Figure 5:
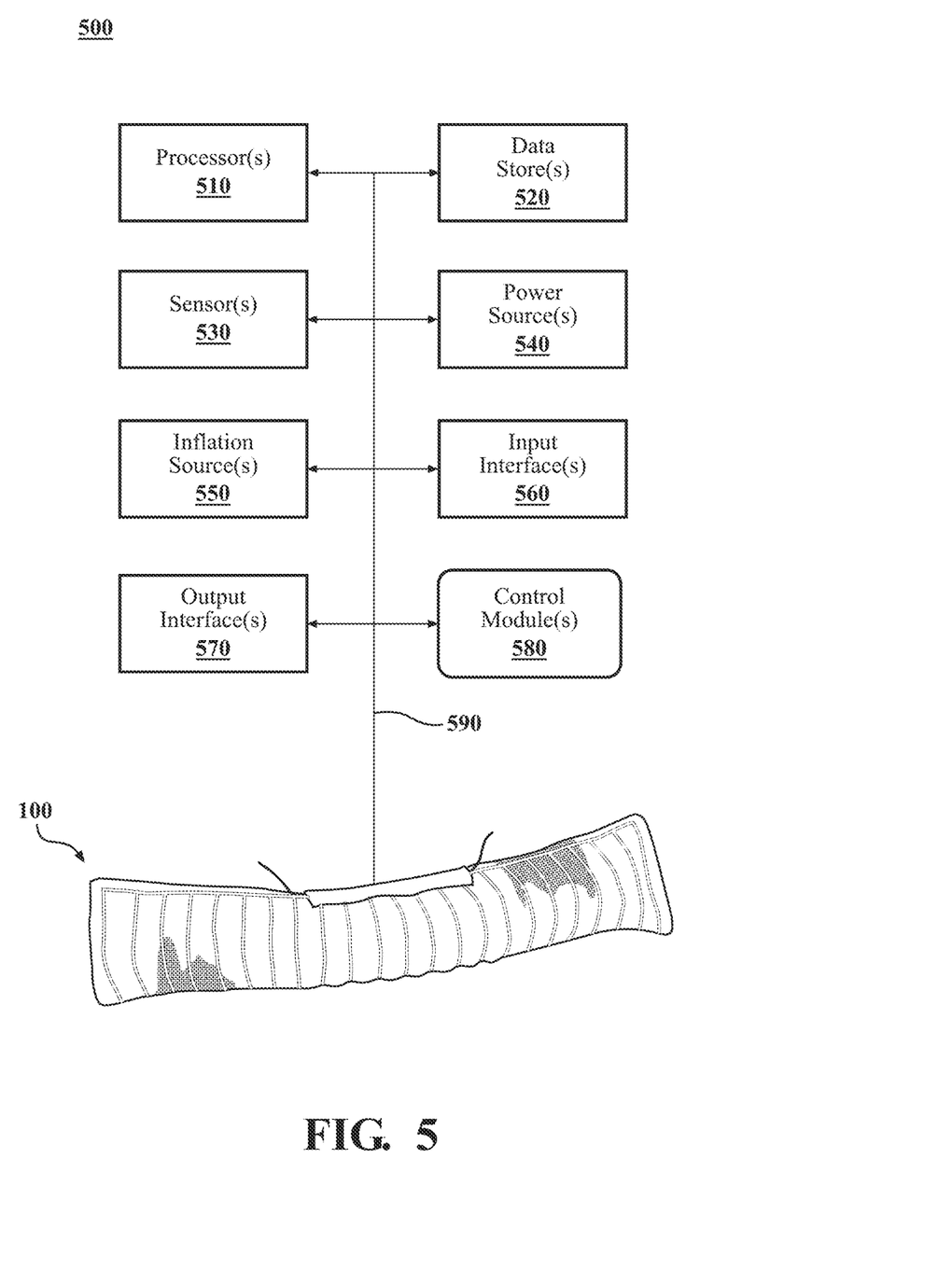
FIG. 5 is an example of a system for morphing a body.

Referring to FIG. 5, an example of a system 500 for morphing a body is shown. The system 500 can include various elements. Some of the possible elements of the system 500 are shown in FIG. 5 and will now be described. It will be understood that it is not necessary for the system 500 to have all of the elements shown in FIG. 5 or described herein. The system 500 can have any combination of the various elements shown in FIG. 5. Further, the system 500 can have additional elements to those shown in FIG. 5. In some arrangements, the system 500 may not include one or more of the elements shown in FIG. 5. Further, while the various elements may be shown as being located on or within the system 500 in FIG. 5, it will be understood that one or more of these elements can be located external to the system 500. Thus, such elements are not located on, within, or otherwise carried by the system 500. Further, the elements shown may be physically separated by large distances. Indeed, one or more of the elements can be located remote from the other elements of the system 500.

The system 500 can include the body 100, one or more processors 510, one or more data stores 520, one or more sensors 530, one or more power sources 540, one or more inflation sources 550, one or more input interfaces 560, one or more output interfaces 570, and one or more control modules 580. Each of these elements will be described in turn below.

As noted above, the system 500 can include the body 100. The above description of the body 100 applies equally here.

The system 500 can include one or more processors 510. "Processor" means any component or group of components that are configured to execute any of the processes described herein or any form of instructions to carry out such processes or cause such processes to be performed. The processor(s) 510 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 510 can include at least one hardware circuit (e.g., an integrated circuit) configured to carry out instructions contained in program code. In arrangements in which there is a plurality of processors 510, such processors can work independently from each other or one or more processors can work in combination with each other.

The system 500 can include one or more data stores 520 for storing one or more types of data. The data store(s) 520 can include volatile and/or non-volatile memory. Examples of suitable data stores 520 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 520 can be a component of the processor(s) 510, or the data store(s) 520 can be operatively connected to the processor(s) 510 for use thereby. The term "operatively connected," as used throughout this description, can include direct or indirect connections, including connections without direct physical contact.

The data store(s) 520 can store one or more actuation profiles for the body 100. Such profiles can include desired actuation sequences, timing information, etc. The data store(s) 520 can include material data about the contracting member(s) 160.

The system 500 can include one or more sensors 530. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 500 includes a plurality of sensors 530, the sensors can work independently from each other. Alternatively, two or more of the sensors can work in combination with each other. In such case, the two or more sensors can form a sensor network. The sensor(s) 530 can be operatively connected to the processor(s) 510, the data store(s) 520, and/or other elements of the system 500 (including any of the elements shown in FIG. 1).

The sensor(s) 530 can include any suitable type of sensor, now known or later developed. The type of sensor may depend on the context in which the system 500 is used. In some arrangements, the sensor(s) 530 can be configured to acquire data about the body 100 and/or the contracting member(s) 160.

The system 500 can include one or more power sources 540. The power source(s) 540 can be any power source capable of and/or configured to energize the contracting member(s) 160 on the body 100 and/or other components of the system 500. For example, the power source(s) 540 can include one or more batteries, one or more fuel cells, one or more generators, one or more alternators, one or more solar cells, and combinations thereof. The power source(s) 540 can be a source of electrical energy.

The system 500 can include one or more inflation sources 550. The inflation source(s) 550 can be any source of air or other suitable gas and/or fluid, now known or later developed, for inflating the body 100. As an example, the inflation source(s) 550 can be an air tank. The inflation source(s) 550 can be operatively connected to the body 100 to supply a fluid to the inner chamber 130 or the sleeve 140.

In some arrangements, the inflation source(s) 550 can be configured to maintain a constant fluid pressure in the inner chamber 130 or the sleeve 140. In some implementations, the inflation source(s) 550 can include a pump. In some arrangements, the inflation source(s) 550 can include a gas canister capable of delivering a compressed gas.

The system 500 can include one or more input interfaces 560. An "input interface" includes any device, component, system, element or arrangement or groups thereof that enable information/data to be entered into a machine. The input interface(s) 560 can receive an input from a user (e.g., a person, a computer, or other entity). Any suitable input interface 560 can be used, including, for example, a keypad, display, touch screen, multi-touch screen, button, joystick, mouse, trackball, microphone, gesture recognition, and/or combinations thereof.

The system 500 can include one or more output interfaces 570. An "output interface" includes any device, component, system, element or arrangement or groups thereof that enable information/data to be presented to a user (e.g., a person) or other entity. The output interface(s) 570 can present information/data to a user or other entity. The output interface(s) 570 can include a display, an earphone, haptic device, and/or speaker. Some components of the system 500 may serve as both a component of the input interface(s) 560 and a component of the output interface(s) 570.

The system 500 can include one or more modules, at least some of which will be described herein. The modules can be implemented as computer readable program code that, when executed by a processor, implement one or more of the various processes described herein. One or more of the modules can be a component of the processor(s) 510, or one or more of the modules can be executed on and/or distributed among other processing systems to which the processor(s) 510 is operatively connected. The modules can include instructions (e.g., program logic) executable by one or more processor(s) 510. Alternatively or in addition, one or more data stores 520 may contain such instructions.

The system 500 can include one or more modules. In one or more arrangements, the modules described herein can include artificial or computational intelligence elements, e.g., neural network, fuzzy logic or other machine learning algorithms. Further, in one or more arrangements, the modules can be distributed among a plurality of modules. In one or more arrangements, two or more of the modules described herein can be combined into a single module.

The system 500 can include one or more control modules 580. The control module(s) 580 can include profiles and logic for actively controlling the body 100 according to arrangements herein. The control module(s) 580 can be configured to determine when the body 100 should be activated or deactivated. The control module(s) 580 can be configured to do so in any suitable manner. For instance, the control module(s) 580 can be configured to analyze data or information acquired by the sensor(s) 530. Alternatively or additionally, the control module(s) 580 can be configured to detect user inputs (e.g., commands) provided on the input interface(s) 560. The control module(s) 580 can retrieve raw data from the sensor(s) 530 and/or from the data store(s) 520. The control module(s) 580 can use profiles, parameters, or setting loaded into the control module(s) 580 and/or stored in the data store(s) 520.

The control module(s) 580 can analyze the sensor data to determine an appropriate action for the body 100. For instance, the control module(s) 580 can detect changes to the body 100 and/or forces affecting the body. The control module(s) 580 can be configured to determine appropriate changes to the shape, configuration, and/or morphology of the body 100. The control module(s) 580 can be configured to cause one or more of the contracting members 160 associated with the body 100 to be activated or deactivated. As used herein, "cause" or "causing" means to make, force, compel, direct, command, instruct, and/or enable an event or action to occur or at least be in a state where such event or action may occur, either in a direct or indirect manner. For instance, the control module(s) 580 can selectively permit or prevent the flow of electrical energy from the power source(s) 540 to the contracting member(s) 160. The control module(s) 580 can be configured send control signals or commands over a communication network to the contracting member(s) 160 or other element of the system 500.

The control module(s) 580 can be configured to cause the contracting member(s) 160 to be selectively activated or deactivated based on one or more activation parameters. For instance, the control module(s) 580 can be configured to compare sensor data to one or more activation thresholds. If the threshold is met, then the control module(s) 580 can cause one or more of the contracting member(s) 160 to be activated or maintained in an activated condition. If the threshold is not met, then the control module(s) 580 can cause one or more of the contracting member(s) 160 to be deactivated or maintained in a deactivated.

In some instances, the control module(s) 580 can be configured to cause the contracting member(s) 160 to be selectively activated or deactivated based on user inputs (e.g., commands or other inputs indicative of activating or deactivating the body 100 or contracting member(s) 160). For instance, a user can provide an input on the input interface(s) 560. The input can be to activate or deactivate the contracting member(s) 160. The control module(s) 580 can be configured to cause the contracting member(s) 160 to be deactivated or activated in accordance with the user input.

The control module(s) 580 can be configured to control a plurality of the contracting members 160. The control module(s) 580 can be configured to control each contracting member 160 individually. Thus, the control of one contracting member 160 can be independent of the control of the other contracting members 160. Alternatively, the control module(s) 580 can be configured to control a plurality of contracting members 160 collectively. Thus, each of the plurality of contracting members 160 can be activated or deactivated at substantially the same time, to substantially the same degree of actuation, and/or in substantially the same manner.

The various elements of the system 500 can be communicatively linked to one another or one or more other elements through one or more communication networks 590. As used herein, the term "communicatively linked" can include direct or indirect connections through a communication channel, bus, pathway or another component or system. A "communication network" means one or more components designed to transmit and/or receive information from one source to another. The data store(s) 520 and/or one or more other elements of the system 500 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential systems, devices, elements and/or components of the system 500 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 6:
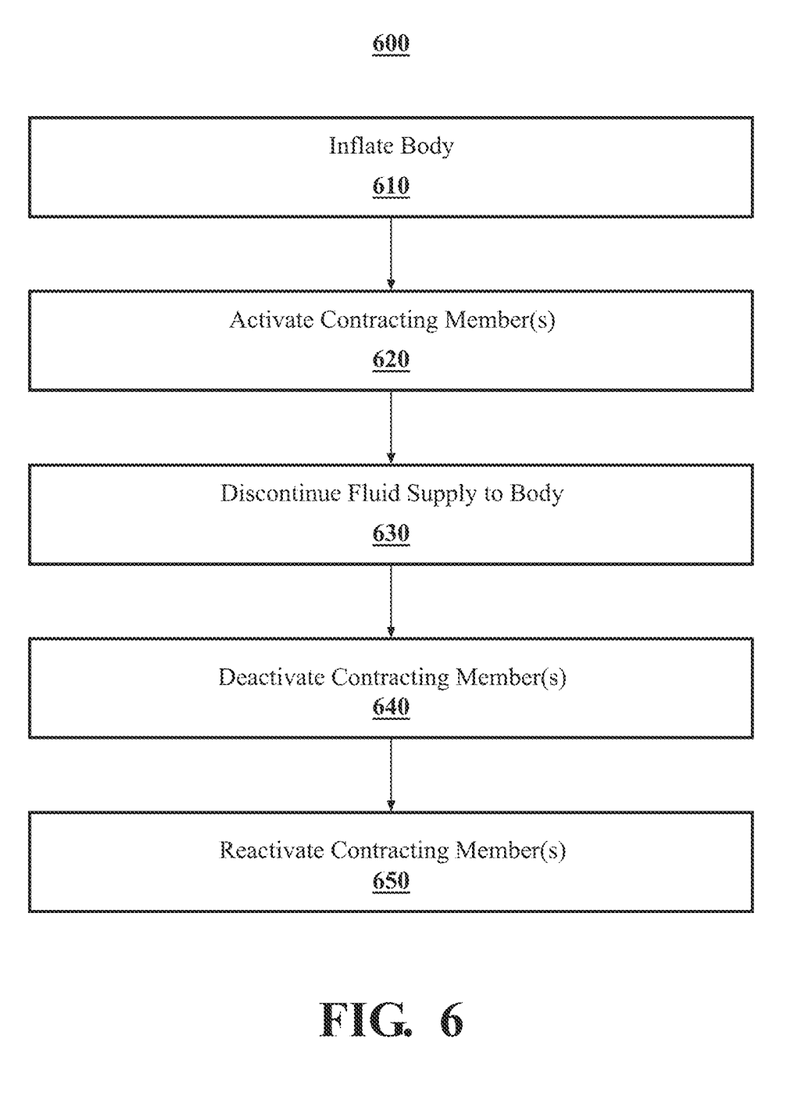
FIG. 6 is an example of a method of morphing a body.

Turning to FIG. 6, an example of a method 600 is shown. For the sake of discussion, the method 600 can begin with the body 100 in a non-activated mode. In the non-activated mode, electrical energy from the power source(s) 540 is not supplied to the contracting member(s) 160. Further, the body 100 can be in a non-inflated state. Thus, air or other fluid is not supplied to the inner chamber 130 of the body 100 or to the sleeve 140 located within the body 100. An example of the body 100 in the non-activated mode and non-inflated state is shown in FIG. 1.

At block 610, the body 100 can be caused to be inflated. Air or other fluid from the inflation source(s) 550 can be supplied to the interior of the body 100 or to the sleeve 140 located within the body 100. The control module(s) 580 can send control signals to allow air or other fluid from the inflation source(s) 550 to be supplied to the interior of the body 100 or to the sleeve 140 located within the body 100. Thus, it will be appreciated that the body 100 will expand from its non-inflated state. At this point, the body 100 can be in the non-activated mode and the inflated state, an example of which is shown in FIG. 4A. The body 100 can be caused to be inflated by the control module(s) 580 and/or the processor(s) 510 based on data acquired by the sensor(s) 530. Alternatively or additionally, the control module(s) 580 and/or the processor(s) 510 can detect a user input indicating that the body 100 should be inflated. The user input can be provided via the input interface(s) 560. The method 600 can continue to block 620.

At block 620, the contracting member(s) 160 can be activated. For example, the control module(s) 580 can cause electrical energy to be supplied from the power source(s) 540 to the contracting member(s) 160. As a result, the contracting member(s) 160 can become heated, which, in turn, causes the contracting member(s) 160 to contract. The contraction of the contracting member(s) 160, along with the arrangement of the contracting member(s) 160 on the body 100 can cause the body 100 to morph into an activated configuration. In the activated configuration, the body 100 can morph (e.g., bend) in the morphing region(s) 153. An example of the activated configuration is shown in FIG. 4B.

The activation of the contracting member(s) 160 can be due to the detection of a body activation condition by the control module(s) 580, the processor(s) 510, and/or one or more sensor(s) 530. For instance, the control module(s) 580, the processor(s) 510, and/or one or more sensor(s) 530 can determine that data acquired by the sensor(s) 530 meets a body activation condition. Alternatively or additionally, the control module(s) 580, the processor(s) 510, and/or one or more sensor(s) 530 can detect a user input indicating that the body 100 should be activated. The user input can be provided via the input interface(s) 560. The method 600 can continue to block 630.

At block 630, the supply of air or other fluid to the inner chamber 130 of the body 100 or to the sleeve 140 can be discontinued. The control module(s) 580 can send control signals to discontinue the supply of air or other fluid from the inflation source(s) 550 to be supplied to the inner chamber 130 of the body 100 or to the sleeve 140 located within the body 100. However, it will be appreciated that, due to the fluid impermeable nature of the body 100 or to the sleeve 140 and due to suitable valves or other closure elements, the body 100 can remain in an inflated state and in the activated condition, as is shown in FIG. 4B. The inflated shape can be locked after removal of the heating from the contracting member(s) 160. The discontinuation of the supply of air or other fluid can be in response to a condition, event, and/or user input or command. The method 600 can continue to block 640.

At block 640, the contracting member(s) 160 can be deactivated. For example, the control module(s) 580 can cause the supply of electrical energy from the power source(s) 540 to the contracting member(s) 160 to be discontinued. It will be appreciated that, due to the material characteristics of the contracting member(s) 160, the body 100 can remain in the activated configuration, as is shown in FIG. 4B. At this point, the activated configuration of the body 100 can be maintained without providing an electrical input to the contracting member(s) 160. The deactivation of the contracting member(s) 160 can be in response to a condition, event, and/or user input or command. The method 600 can continue to block 650.

At block 650, the original, inflated shape of the body 100 can be restored. For example, the control module(s) 580 can cause electrical energy to be re-supplied from the power source(s) 540 to the contracting member(s) 160. As a result, the contracting member(s) 160 can become re-heated. As a result of the material properties of the contracting member(s) 160, the re-heating of the contracting member(s) 160 can cause the contracting member(s) 160 to relax to a non-activated state. The body 100 can straighten out as the morphing aspects (e.g., bend(s)) disappear. Thus, the body 100 can morph into its non-activated condition, as shown in FIG. 4A.

The re-activation of the contracting member(s) 160 can be due to the detection of a condition by the control module(s) 580, the processor(s) 510, and/or one or more sensor(s) 530. For instance, the control module(s) 580, the processor(s) 510, and/or one or more sensor(s) 530 can determine that data acquired by the sensor(s) 530 meets a condition. Alternatively or additionally, the control module(s) 580, the processor(s) 510, and/or one or more sensor(s) 530 can detect a user input indicating that the body 100 should be restored to its non-activated state. The user input can be provided via the input interface(s) 560.

The method 600 can end. Alternatively, the method 600 can return to block 610 or some other block.

Arrangements described herein can be used in various applications. For example, the body 100 can be used in connection with a robotic finger or a gripper. The body 100 can bend to mimic a human finger. Arrangements described herein can be used in connection with vehicular, aircraft, manufacturing, and/or medical applications, just to name a few possibilities.

It will be appreciated that arrangements described herein can provide numerous benefits, including one or more of the benefits mentioned herein. For example, arrangements described herein can provide for remote and/or automated control of the shape/morphology of a body. Arrangements described herein can enable large and quick changes in shape, configuration, or morphology of a body based on real-time conditions. Arrangements described herein can provide a robotic finger that can bend in a way that mimics human fingers. Arrangements described herein can enable the desired degree(s) of the freedom and/or bending angle(s) of the body. According to arrangements described herein, a shape memory polymer can be applied on any location of the body. The shape memory polymer can be applied in different joint areas and can function as a hinge. Arrangements described herein can be configured such that, upon the shape memory effect, the final shape of the inflatable finger can be controlled and locked, so that the finger can hold larger weight. Arrangements described herein can reduce power consumption. Upon inflation of the body and heating of the contracting member, the bending or morphing shape of the body is formed. And, according to arrangements described herein, once the activation input to the contracting member is removed, the bending or morphed shape of the body can be locked.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A morphable body comprising:
a body, the body being inflatable; and
one or more body support members operatively connected to the body, the one or more body support members being arranged in a first pattern to define a morphing region and in a second pattern to define a non-morphing region, the first pattern including a plurality of linear segments that are substantially parallel to each other, the second pattern including a grid pattern with a first plurality of linear segments and a second plurality of linear segments that are transverse to each other; and
a contracting member operatively connected to the body, the contracting member being a shape memory material,
when activated, the contracting member contracts to cause the body to morph from a non-activated configuration into an activated configuration, and
when subsequently deactivated, the contracting member maintains the activated configuration of the body.

2. The morphable body of claim 1, wherein, when subsequently re-activated, the contracting member relaxes to cause the body to substantially return to the non-activated configuration.

3. The morphable body of claim 1, further including a sleeve received within a hollow interior of the body, and wherein the sleeve is air impermeable, whereby the body is inflatable.

4. The morphable body of claim 1, wherein the body is made of an air impermeable fabric, whereby the body is inflatable.

5. The morphable body of claim 1, wherein, in the first pattern, the plurality of linear segments are substantially perpendicular to a direction of elongation of the body.

6. The morphable body of claim 1, wherein the shape memory material is a shape memory polymer.

7. A system comprising:
a morphable body including:
a body, the body being inflatable;
one or more body support members operatively connected to the body, the one or more body support members being arranged in a first pattern to define a morphing region and in a second pattern to define a non-morphing region, the first pattern including a plurality of linear segments that are substantially parallel to each other, the second pattern including a grid pattern with a first plurality of linear segments and a second plurality of linear segments that are transverse to each other; and
a contracting member operatively connected to the body, when activated, the contracting member contracts to cause the body to morph from a non-activated configuration into an activated configuration, the contracting member being a shape memory material,
when subsequently deactivated, the contracting member maintains the activated configuration of the body; and
a processor operatively connected to cause the contracting member to be activated and deactivated.

8. The system of claim 7, further including one or more inflation sources operatively connected to inflate the body, and wherein the processor is operatively connected to control a supply of fluid from the one or more inflation sources to the body.

9. The system of claim 7, further including one or more power sources operatively connected to the contracting member, and wherein the processor is operatively connected to control a supply of electrical energy from the one or more power sources to the contracting member.

10. The system of claim 9, wherein causing the contracting member to be activated includes
causing electrical energy to be supplied to the contracting member from the one or more power sources, and
wherein causing the contracting member to be deactivated includes causing the supply of electrical energy to the contracting member to be discontinued.

11. The system of claim 7, wherein the processor is further configured to:
cause the contracting member to be reactivated, whereby the body substantially returns to the non-activated configuration.

12. The system of claim 7, further including a sleeve received within a hollow interior of the body, and wherein the sleeve is air impermeable, whereby the body is inflatable.

13. The system of claim 7, wherein the body is made of an air impermeable fabric, whereby the body is inflatable.

14. The system of claim 9, wherein the plurality of linear segments of the first pattern are substantially perpendicular to a direction of elongation of the body.

15. The system of claim 7, wherein the shape memory material is a shape memory polymer.

16. A method of controlling a morphable body that is inflatable, the morphable body including a body, one or more body support members operatively connected to the body, the one or more body support members being arranged in a first pattern to define a morphing region and in a second pattern to define a non-morphing region, the first pattern including a plurality of linear segments that are substantially parallel to each other, the second pattern including a grid pattern with a first plurality of linear segments and a second plurality of linear segments that are transverse to each other, and a contracting member operatively connected to the body, the contracting member being a shape memory material, the method including:
activating the contracting member such that the contracting member contracts to cause the body to morph from a non-activated configuration into an activated configuration; and
subsequently deactivating the contracting member such that the activated configuration of the body is maintained by the contracting member.

17. The method of claim 16, further including:
re-activating the contracting member such that the contracting member relaxes to cause the body to substantially return to the non-activated configuration.

* * * * *

UNITED STATES PATENT AND TRADEMARK OFFICE
CERTIFICATE OF CORRECTION

| | | |
|---|---|---|
| PATENT NO. | : 12,296,478 B2 | Page 1 of 1 |
| APPLICATION NO. | : 18/351878 | |
| DATED | : May 13, 2025 | |
| INVENTOR(S) | : Yuyang Song et al. | |

It is certified that error appears in the above-identified patent and that said Letters Patent is hereby corrected as shown below:

In the Specification

Column 8, Lines 8-9: delete "The term "operatively connected." as used" and insert --The term "operatively connected," as used--

In the Claims

Column 16, Line 31, Claim 14: delete "The system of claim 9," and insert --The system of claim 7,--

Signed and Sealed this
Twenty-fourth Day of June, 2025

Coke Morgan Stewart
*Acting Director of the United States Patent and Trademark Office*